US010063301B2

(12) United States Patent
Agardh

(10) Patent No.: US 10,063,301 B2
(45) Date of Patent: Aug. 28, 2018

(54) MIMO BEAM STEERING FOR LOCATION-BASED DATA ROUTING

(71) Applicant: Sony Corporation, Tokyo (JP)

(72) Inventor: Kåre Agardh, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 23 days.

(21) Appl. No.: 14/356,955

(22) PCT Filed: Nov. 5, 2013

(86) PCT No.: PCT/IB2013/002446
§ 371 (c)(1),
(2) Date: May 8, 2014

(87) PCT Pub. No.: WO2015/067978
PCT Pub. Date: May 14, 2015

(65) Prior Publication Data
US 2016/0241321 A1 Aug. 18, 2016

(51) Int. Cl.
*H04B 7/06* (2006.01)
*H04B 7/0413* (2017.01)
(Continued)

(52) U.S. Cl.
CPC ......... *H04B 7/0617* (2013.01); *H04B 7/0413* (2013.01); *H04L 45/126* (2013.01); *H04W 40/20* (2013.01); *H04W 84/12* (2013.01)

(58) Field of Classification Search
CPC ... H04B 7/0617; H04B 7/0413; H04W 40/20; H04W 84/12; H04L 45/126
See application file for complete search history.

(56) References Cited

U.S. PATENT DOCUMENTS 6,816,115 B1    11/2004  Redi et al.
2012/0096181 A1*  4/2012  Petrus ............... H04L 45/06
                                                709/239
2014/0148155 A1*  5/2014  Batta ................ H04W 16/28
                                                455/432.1

FOREIGN PATENT DOCUMENTS

EP          1137224 A1      9/2001

OTHER PUBLICATIONS

Choudhury, R. R. et al., "On Designing MAC Protocols for Wireless Networks Using Directional Antennas", IEEE Transactions on Mobile Computing, IEEE Service Center, Los Alamitos, CA, US, vol. 5, No. 5, May 1, 2006, pp. 477-491, XP001545984.
(Continued)

*Primary Examiner* — Walter J Divito
(74) *Attorney, Agent, or Firm* — James C. Edwards; Moore & Van Allen PLLC

(57) ABSTRACT

The invention is directed to systems, methods and computer program products for determining a transmission path for a data packet through a network. An exemplary method comprises: tagging, at a first node, a data packet with at least one of a direction or a location of a second node; determining whether the second node is in a transmission area of the first node; in response to determining the second node is not in the transmission area of the first node, selecting a third node within the transmission area of the first node based on the at least one of the direction or the location of the second node; and transmitting the data packet to the third node.

13 Claims, 1 Drawing Sheet

(51) Int. Cl.
*H04W 40/20* (2009.01)
*H04W 84/12* (2009.01)
*H04L 12/733* (2013.01)

(56) References Cited

OTHER PUBLICATIONS

International Search Report and Written Opinion; dated Apr. 25, 2014; issued in International Patent Application No. PCT/IB2013/002446.
International Preliminary Report on Patentability; dated May 19, 2016; issued in International Patent Application No. PCT/IB2013/002446.

\* cited by examiner

[Fig. 1]
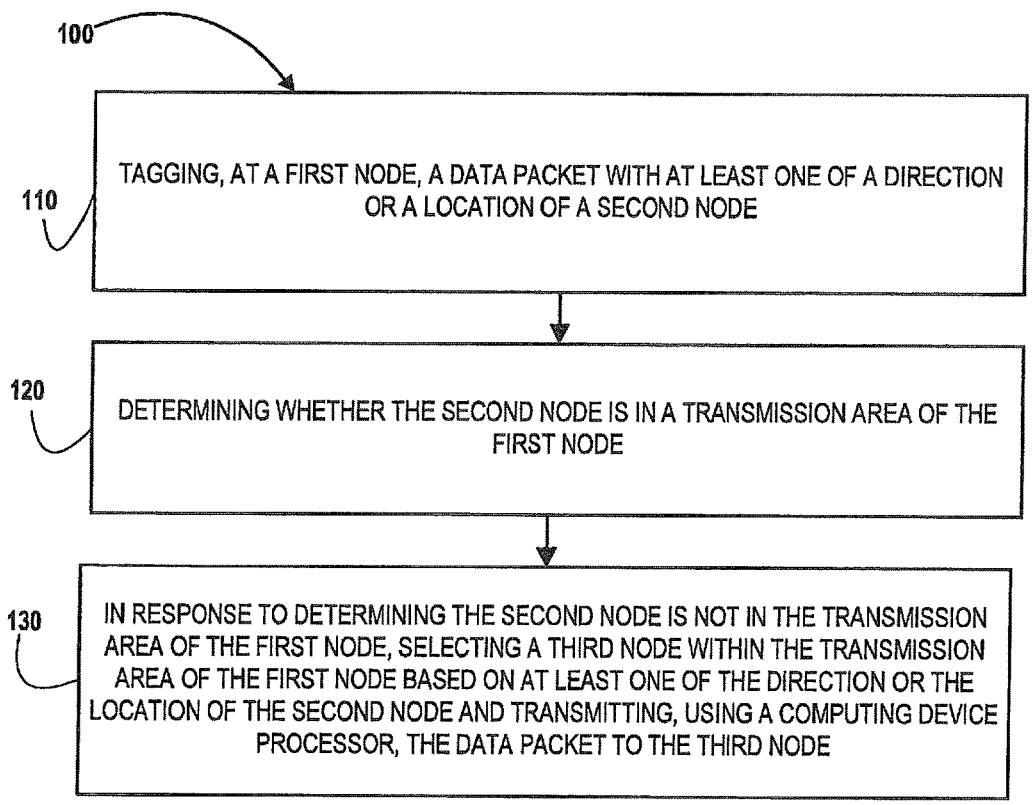
[Fig. 2]
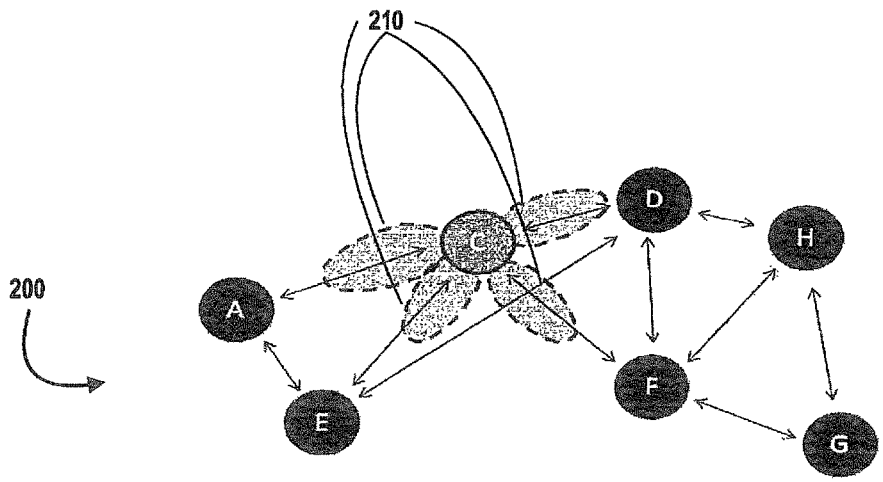

MIMO BEAM STEERING FOR LOCATION-BASED DATA ROUTING

BACKGROUND ART

Devices in wireless networks can be connected in a mesh structure, i.e., one device is connected to one or more other devices in an ad-hoc manner. Each device in a mesh network is referred to as a node. In such networks, data traffic needs to find its way from the transmitting node to the receiving node by jumping through one or more other nodes. There is a need to find the best or most-efficient route from the transmitting node to the receiving node.

SUMMARY

Embodiments of the invention are directed to systems, methods and computer program products for determining a transmission path for a data packet through a network. An exemplary method comprises: tagging, at a first node, using a computing device processor, a data packet with at least one of a direction or a location of a second node; determining, using a computing device processor, whether the second node is in a transmission area of the first node; in response to determining the second node is not in the transmission area of the first node, selecting, using a computing device processor, a third node within the transmission area of the first node based on the at least one of the direction or the location of the second node; and transmitting, using a computing device processor, the data packet to the third node.

In some embodiments, the network comprises a wireless local area network (WLAN).

In some embodiments, the WLAN comprises a cellular network.

In some embodiments, the first node is associated with a device.

In some embodiments, the device comprises multiple-input multiple-output (MIMO) capability.

In some embodiments, the device comprises at least two antennas.

In some embodiments, the at least two antennas enable beam forming.

In some embodiments, the first node is associated with a mobile device.

In some embodiments, the first node is associated with at least one of a mobile computing device, a mobile phone, an audio device, a television, a tablet, or a watch.

In some embodiments, the location comprises a geographical location.

In some embodiments, the location is associated with the direction.

In some embodiments, the location comprises a network location.

In some embodiments, the third node is selected based on at least one beam steering parameter.

In some embodiments, the first node stores direction information or location information associated with other nodes directly connected to the first node or located within the transmission area of the first node.

In some embodiments, an apparatus is provided for determining a transmission path for a data packet through a network. The apparatus comprises: a memory; a processor; and a module stored in the memory, executable by the processor, and configured to: tag, at a first node, a data packet with at least one of a direction or a location of a second node; determine whether the second node is in a transmission area of the first node; in response to determining the second node is not in the transmission area of the first node, select a third node within the transmission area of the first node based on the at least one of the direction or the location of the second node; and transmit the data packet to the third node.

In some embodiments, a computer program product is provided for determining a transmission path for a data packet through a network. The computer program product comprises a non-transitory computer-readable medium comprising a set of codes for causing a computer to: tag, at a first node, a data packet with at least one of a direction or a location of a second node; determine whether the second node is in a transmission area of the first node; in response to determining the second node is not in the transmission area of the first node, select a third node within the transmission area of the first node based on the at least one of the direction or the location of the second node; and transmit the data packet to the third node.

BRIEF DESCRIPTION OF DRAWINGS

Having thus described embodiments of the invention in general terms, reference will now be made to the accompanying drawings, where:

FIG. 1 is an exemplary process flow for determining a transmission path for a data packet through a network, in accordance with embodiments of the present invention;

FIG. 2 is an exemplary network environment, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for determining an optimal (e.g., fastest, shortest, etc.) transmission path through a mesh network. As used herein, a network may be a wired or wireless network. For example, the network may be a wireless local area network (WLAN). An exemplary WLAN is a cellular network. Each device on the mesh network may be connected to one or more other devices. As used herein, a device may be associated with or may also be referred to as a node.

The present invention is directed to determining the location (e.g., network location and/or geographical location) of nodes on a network, and transmitting data from a first node to a second node via the shortest (e.g., fewest number of intervening nodes or geographically shortest) possible transmission path or the fastest possible transmission path.

It is increasingly common in mobile devices to implement more than one antenna (multiple-input multiple-output MIMO capability) in order to increase throughput and range for wireless networks. In devices with MIMO capability, there is the optional possibility to implement beam forming, i.e., tuning the two (or more) antennas so their combined radiation will have strong directivity, i.e., energy or signals produced by the antennas will be transmitted substantially in a single direction, thereby reaching receiving devices located at a distance greater than a predetermined distance from the transmitting device. Additionally, the beam forming method described herein includes a method to receive information associated with which direction the targeted device is facing or associated with the targeted device's location, and then steering the beam based on the direction or the location. The invention described herein uses information from MIMO beam steering (e.g., beam steering parameters) as input when selecting an optimal data transmission path through a mesh network.

Therefore the present invention provides a MIMO beam steering technique. The beam steering technique uses feedback methods to obtain an approximate direction of transmission from the transmitting device to the receiving device. This direction is used when selecting the next node to hop to in a mesh network transmission path. As used herein, a direction may be an angle between two nodes.

A first device in a network stores direction information associated with each node or device directly connected to or within the transmission range of the first device. When a first device wants to transmit a data packet to a second device on the network, the first device tags the data packet with the location (e.g., absolute geographical location (longitude, latitude, address, etc.), network location (Internet Protocol (IP) address), etc.) of the recipient device. If the second device is detected by the first device to be in the transmission area of the first device or directly connected to the first device, the first device transmits the data packet directly to the second device. If the first device is not directly connected to the second device or is determined by the first device to not be in the transmission area of the first device, the first device transmits the data packet to a third device directly connected to the first device on the network or located within the transmission area of the first device. The selection of the third device is based on the location of the final recipient device or direction information associated with the final recipient device, which in this case is the second device.

Referring now to FIG. 1, FIG. 1 describes an exemplary process flow for transmitting data from a first node to a second node in a network. At step 110, the process flow comprises tagging, at a first node, a data packet with at least one of a direction or a location of a second node. At step 120, the process flow comprises determining whether the second node is in a transmission area of the first node. At step 130, the process flow comprises in response to determining the second node is not in the transmission area of the first node, selecting a third node within the transmission area of the first node based on the at least one of the direction or the location of the second node, and transmitting the data packet to the third node.

In some embodiments, the location of the second node is known at the first node, and hence the first node tags the data packet with the location of the second node. In other embodiments, the location of the second node is not known at the first node. For example, the first node has information on the direction of the second node, but not the second node's absolute location. In other such embodiments, the first node has partial information such as a known connected node to the second node that is in a known direction. In such embodiments, the first node transmits the data packet to the known connected node. In other such embodiments, the first node has only a single connected node and no other alternate connected node that might have information on the direction to the second node. In such embodiments, the first node transmits the data packet to the single connected node.

Referring now to FIG. 2, FIG. 2 displays an exemplary mesh network with nodes A, C, D, E, F, G, and H. Assume that node A wants to send a data packet to node H. Nodes C and E are the nodes closest to node A. Node A determines that node H is outside the transmission area (or transmission field) of node A. For example, this determination is made based on a lack of response from node H in response to a signal or energy emanated from an antenna of node A. Then, node A decides to transmit the data packet to node C, rather than node E, based on determining that node C, rather than node E, is closer to node H. The selection of node C is based on direction information associated with the other nodes (in the transmission field of node A) captured by the MIMO antennas of node A. Therefore, node A transmits the data packet to node C. Subsequently, node C then determines which node to transmit the data packet to based on direction information associated with the other nodes (in the transmission field of node C) captured by the MIMO antennas of node C. FIG. 2 indicates the electromagnetic fields 210 associated with the MIMO antennas of node C. Each device associated with each node includes a processor, a memory, and a module stored in the memory, executable by the processor, and configured to perform the various processes described herein, including the capability to communicate with other devices on the network.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for determining a transmission path for a data packet through a mesh network using one or more computing device processors, the method comprising:
   determining, at a first node, a direction relative to the first node of nodes in the transmission area of the first node based on Multiple Input Multiple Output (MIMO) beam steering parameters obtained at the first node;
   tagging, at the first node, using one of the one or more computing device processors, a data packet with a location of a second node;
   determining, using one of the one or more computing device processors, whether the second node is in a transmission area of the first node and whether the second node is directly connected to the first node;

in response to determining the second node is not in the transmission area of the first node and the second node is not directly connected to the first node, selecting, using one of the one or more computing device processors, a third node within the transmission area of the first node based on the location of the second node and the determined direction relative to the first node of the nodes in the transmission area of the first node, wherein the third node is a next node in the transmission path for communicating the data packet to the second node; and in response to selecting the third node, transmitting, using one of the one or more computing device processors, the data packet from the first node to the third node, wherein the first, second and third nodes comprise multiple-input multiple-output (MIMO) capability.

2. The method of claim 1, wherein the network comprises a wireless local area network (WLAN).

3. The method of claim 2, wherein the WLAN comprises a cellular network.

4. The method of claim 1, wherein the first node is associated with a device.

5. The method of claim 4, wherein the first, second and third nodes comprise at least two antennas.

6. The method of claim 5, wherein the at least two antennas enable beam forming.

7. The method of claim 1, wherein the first node is associated with a mobile device.

8. The method of claim 1, wherein the first node is associated with at least one of a mobile computing device, a mobile phone, an audio device, a television, a tablet, or a watch.

9. The method of claim 1, wherein the third node is selected based on at least one beam steering parameter.

10. The method of claim 1, wherein the third node is directly connected to the first node.

11. The method of claim 1, wherein the first node stores direction information associated with other nodes directly connected to the first node or located within the transmission area of the first node.

12. An apparatus for determining a transmission path for a data packet through a mesh network, the apparatus comprising:

a memory;

a processor; and a module stored in the memory, executable by the processor, and configured to:

determine, at a first node, a direction relative to the first node of nodes in the transmission area of the first node based on Multiple Input Multiple Output (MIMO) beam steering parameters obtained at the first node;

tag, at the first node, a data packet with a location of a second node;

determine whether the second node is in a transmission area of the first node and whether the second node is directly connected to the first node;

in response to determining the second node is not in the transmission area of the first node and the second node is not directly connected to the first node, select a third node within the transmission area of the first node based on the location of the second node and the determined direction relative to the first node of the nodes in the transmission area of the first node, wherein the third node is a next node in the transmission path for communicating the data packet to the second node; and in response to selecting the third node, transmit the data packet from the first node to the third node, wherein the first, second and third nodes comprise multiple-input multiple-output (MIMO) capability.

13. A computer program product for determining a transmission path for a data packet through a mesh network, the computer program product comprising:

a non-transitory computer-readable medium comprising a set of codes for causing a computer to:

determine, at a first node, a direction relative to the first node of nodes in the transmission area of the first node based on Multiple Input Multiple Output (MIMO) beam steering parameters obtained at the first node;

tag, at a first node, a data packet with a location of a second node;

determine whether the second node is in a transmission area of the first node and whether the second node is directly connected to the first node;

in response to determining the second node is not in the transmission area of the first node and the second node is not directly connected to the first node, select a third node within the transmission area of the first node based the location of the second node and the determined direction relative to the first node of the nodes in the transmission area of the first node, wherein the third node is a predetermined next node in the transmission path for communicating the data packet to the second node; and in response to selecting the third node, transmit the data packet from the first node to the third node, wherein the first, second and third nodes comprise multiple-input multiple-output (MIMO) capability.

\* \* \* \* \*